United States Patent [19]

Gun-Munro

[11] Patent Number: 5,676,094
[45] Date of Patent: Oct. 14, 1997

[54] PROTECTIVE LEG WRAP FOR ANIMALS

[76] Inventor: Beverly J. Gun-Munro, 22050 De La Osa St., Woodland Hills, Calif. 91364

[21] Appl. No.: 311,997

[22] Filed: Sep. 26, 1994

[51] Int. Cl.$^6$ .................................. A01K 27/00
[52] U.S. Cl. ........................................... 119/850
[58] Field of Search .................. 119/850, 855, 119/814, 815, 816, 817; 128/876, 878, 881, 882, 892

[56] References Cited

U.S. PATENT DOCUMENTS

| | | | |
|---|---|---|---|
| 3,535,718 | 10/1970 | Murcoth | 128/828 |
| 3,817,245 | 6/1974 | Kroeger | 128/876 |
| 4,719,876 | 1/1988 | Wilken | 119/815 |
| 4,858,625 | 8/1989 | Cramer | 128/876 X |
| 4,905,715 | 3/1990 | Johnson | 128/882 |
| 5,070,886 | 12/1991 | Alexander et al. | 128/876 X |
| 5,137,508 | 8/1992 | Engman | 119/850 X |

FOREIGN PATENT DOCUMENTS 2265812  10/1993  United Kingdom ............ 119/850

Primary Examiner—Thomas Price

[57] ABSTRACT

A protective wrap for the legs of animals to prevent insects or sticker type plants from contacting such wrapped legs. The wrap is made up of a mesh-type material which keeps the insects off while allowing free air circulation. The mesh material is bordered by plush or a smooth material to prevent cutting or abrasion of the leg and to prevent insects from crawling under the wrap. The panel may be reinforced or strengthened by the addition of a foam layer between the binding and mesh panel or by adding a diagonal stripe of stiff material. The wrap is fastened by overlapped portions of a loop and hook-type fastener.

9 Claims, 2 Drawing Sheets

PROTECTIVE LEG WRAP FOR ANIMALS

BACKGROUND OF THE INVENTION

1. Field of the Invention

The invention relates to protective equipment for animals and, more particularly, to a protective wrap for animal legs to protect them from flying and crawling insects and plant burrs, thorns etc. which can irritate, infect or injure the animal.

2. Description of Prior Art

Flying and crawling insects are a constant irritation and source of sickness to certain farm and pasture roaming animals such as horses, mules, donkeys and cows. In recent years diseases carried by ticks have become more widespread as ticks inhabit a greater part of the United States for example.

Attention has been paid to protective devices to keep insects out of the eyes of horses, one such device is shown in U.S. Pat. No. 4,662,156 issued May 5, 1987 but little attention has been paid to protect the legs of an animal from both flying and crawling insects.

SUMMARY OF THE INVENTION

The instant invention provides a protective leg wrap which can be placed about the leg of an animal to prevent flying or crawling insects from engaging and prevent burrs, thorns and the like from piercing the skin or adhering to the animal leg below the wrap. The wrap is made up of a panel made from a mesh material that is light weight and freely permits the passage of air and heat through it. The panel can be bounded on all sides by a plush material or a smooth binding material so that the animal leg can not be cut or abraded by engaging the panel edges. The plush or smooth binding material allows the wrap to better conform to the animal's leg and prevents crawling insects from getting under the panel. Fasteners hold the wrap in its closed position with the marginal edges of the wrap overlapped. A foam liner may be placed between the binding and panel for additional strength which can also be achieved by use of a diagonal strip of a stiff material. It is an object of the invention to provide a protective wrap for an animal's legs.

It is an object of the invention to provide a protective animal leg wrap comprised of a panel which is placed about the leg in a marginal edge overlapping condition with fasteners to maintain the overlapped condition of the wrap.

It is still another object of the invention to provide a protective animal leg wrap comprised of a mesh panel which is wrapped about the leg in a marginal edge overlapping condition and held in such position by a series of fasteners on said panel.

It is yet another object of the invention to provide an adjustable protective animal wrap comprised of a mesh panel bordered in plush material and having a series of fasteners to hold the wrap closed after the panel has been wrapped about an animal's leg.

It is another object of the invention to provide an adjustable, protective animal wrap comprised of a mesh panel bordered in smooth material and having a series of fasteners to hold the wrap closed after the panel has been wrapped about an animal's leg.

It is yet another object of the invention to provide an adjustable, protective animal wrap comprised of a mesh panel bordered in a smooth reinforced material and having a series of fasteners to hold the wrap closed after the panel has been wrapped about an animal's leg.

It is still another object of the invention to provide an adjustable protective animal wrap comprised of a mesh panel bordered on all edges and having a diagonal reinforcement strip and a series of fasteners to hold the wrap closed after the panel has been wrapped about an animal's leg.

Other objects and features of the invention will be pointed out in the following description and claims and illustrated in the accompanying drawings, which disclose, by way of example, the principles of the invention, and the best mode presently contemplated for carrying it out.

BRIEF DESCRIPTION OF THE DRAWINGS

In the drawing in which similar elements are given similar reference characters:

Turning to FIG. 1 there is shown a protective leg wrap 10 for animals. The wrap 10 comprises a mesh panel 12 having a top edge 14, a bottom edge 16, a first marginal edge 18 and a second marginal edge 20. The mesh panel 12, in one example, is square and its length and width are both about 14 inches. It should be understood that these dimensions can be decreased or increased and do not have to be the same for length and width so that the panel becomes a rectangle. The mesh panel 12 can be made up of mesh made of cotton threads, rayon, nylon etc. but the preferred material is an elastomeric mesh material formed of polyester cords and covered with vinyl, woven into a mesh and then subjected to heat and pressure to join the cords at their crossing points. The vinyl coating should contain ultraviolet inhibitors and can be colored as desired. The mesh size may vary in its ratio of open area/closed area from about 40%/60% to 20%/80%. The mesh chosen depends greatly on the insects to be protected against while allowing the free flow of air therethrough.

Figure 1:
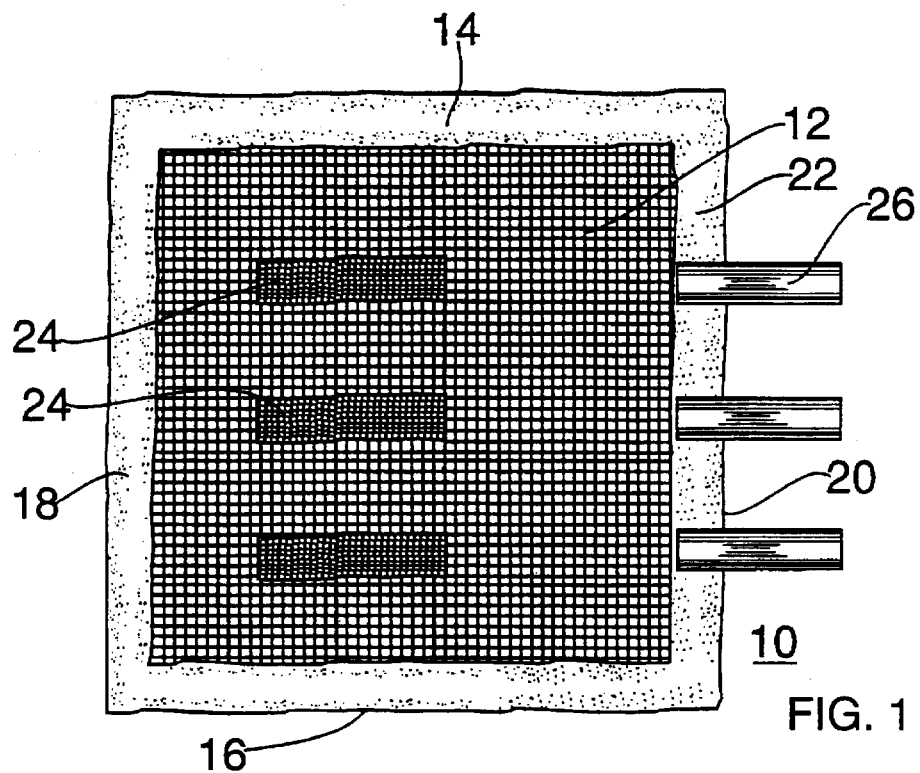
FIG. 1 is a top plan view of a protective leg wrap for animals constructed in accordance with the concepts of the invention.

To prevent chafing or abrasion of the animal's leg at the edges of panel 12, and also to prevent insects from crawling under the panel 12 which might otherwise require the panel to be tightly wrapped about the leg making injury more likely, a binding 22 of plush material such as lambs wool, is employed. The plush material is contained on material backing strips or layers (not shown) which are folded along their length to form a U-shaped band. The panel 12 edge is placed in the closed end of the U and the binding 22 is fastened to itself and the panel by stitching along the open end of the U.

The fastening means can be straps and buckles, tie cords, draw strings or other similar devices. However, the preferred fastenings are a series of hook and loop fasteners of the type sold under the trademark VELCRO. The loop portion strip 24 is fastened to the panel 12 mesh. As shown three loop portion strips, about 4½ inches long and ¾ inches wide are equally spaced from top edge 14 to bottom edge 16. The strips 24 start at approximately the center of panel 12 and extend towards marginal edge 18. It should be understood that the dimensions and placement of the fastener strips 24, 26 can be varied as desired, for example the strips could be 1½ inches wide. The three hook portion straps 26 are fastened at the inward edge of binding 22 and extend beyond the marginal edge 20. In this arrangement, only portions of the loop portion strap 24 are left exposed when strap portions 24 and 26 are engaged. The loop portion strap 24 being softer it will not injure the animal as the harder, sharper hook portion 26 could.

To use the protective leg wrap 10, the panel 12 is grasped near the top edge 14 and the panel 12 is moved about the animal leg until it overlaps itself. (See FIG. 2). Then the hook portion strap 26 is joined to the loop portion strap 24 so that the plush border 22 seals the panel 12 against the animal's leg.

Figure 2:
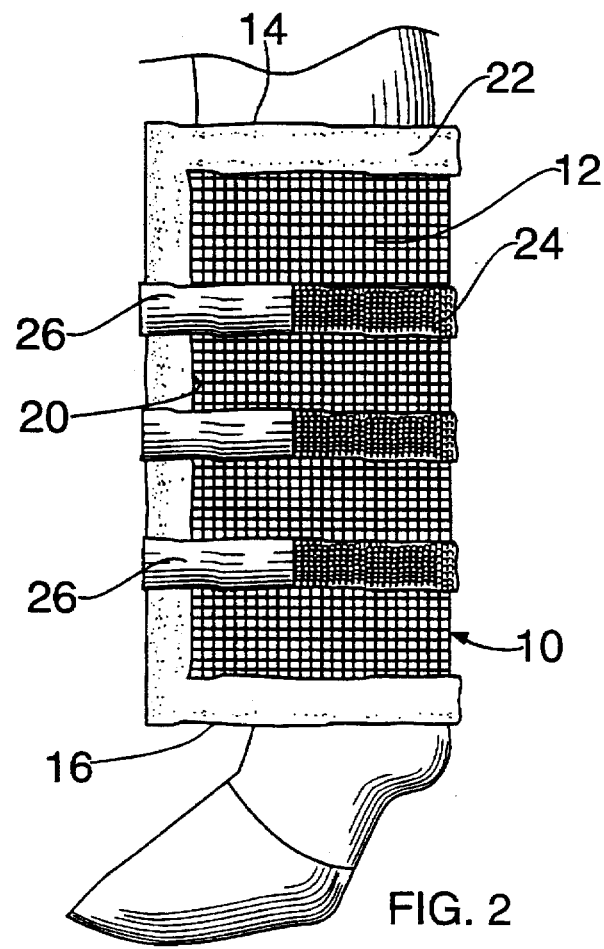
FIG. 2 is a side elevational view of the protective leg wrap of FIG. 1 fastened about the leg of an animal.
Figure 3:
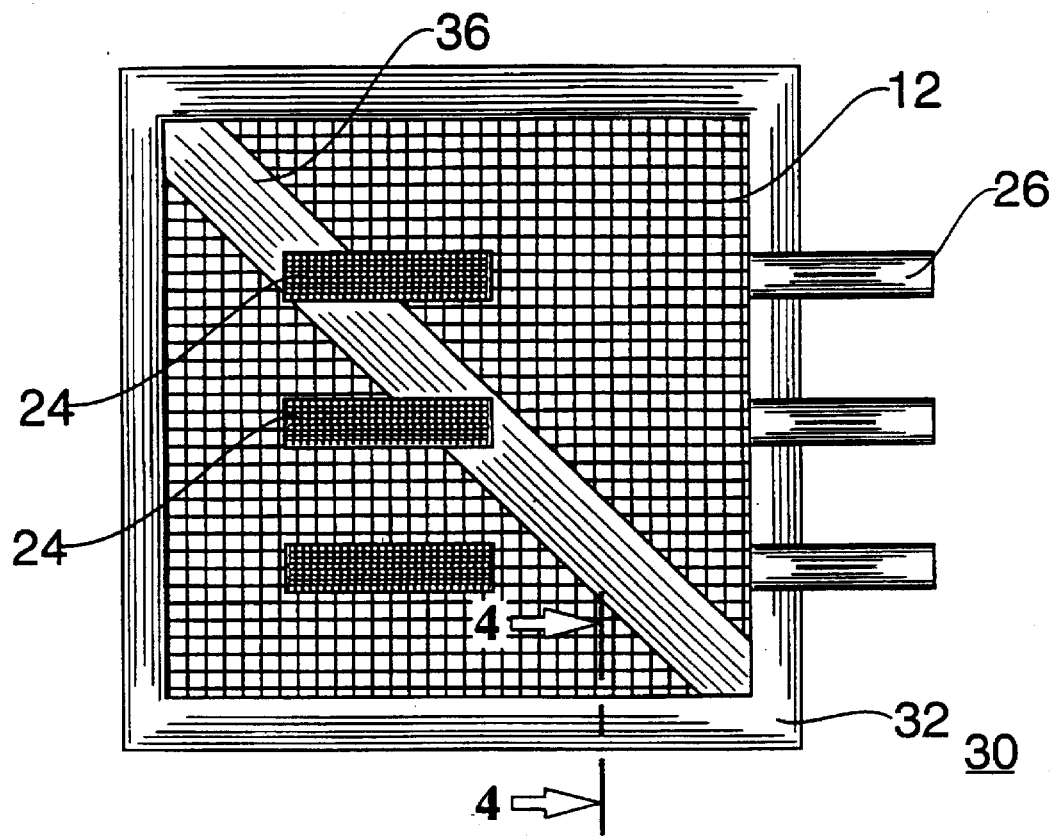
FIG. 3 is a top plan view of a further embodiment of a protective leg wrap for animals constructed in accordance with the concepts of the invention.
Figure 4:
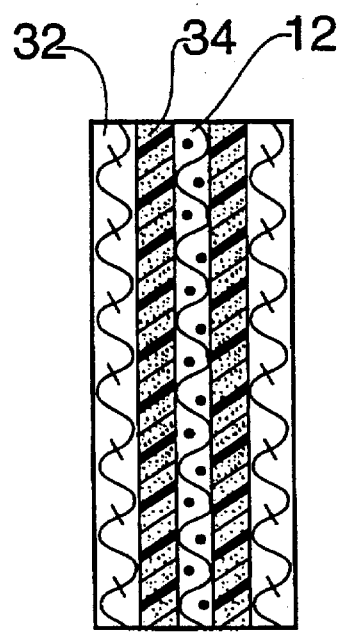
FIG. 4 is an enlarged view, in section, of the portion of the animal wrap of FIG. 3 taken along lines 4—4.

Turning now to FIGS. 3 and 4 a second embodiment of an animal wrap 30, constructed in accordance with the concepts of the invention is shown. A material layer such as mesh panel 12 has a binding material layer 32 placed along all four edges 14, 16, 18 and 20. The binding 32 is smooth in its finish and may be a smooth nylon fabric binding material layer which can be folded over the edges and sewed to itself through the panel 12. To provide additional support and to permit wrap 30 conforming to the animal's leg, a further material layer such as foam liner or layer 34 can be placed between the panel 12 and the binding material layer 32 as is shown in FIG. 4. If desired this foam liner or layer 34 could also be used with the wrap of FIGS. 1 and 2.

For further strength and to permit the wrap to be flat along the animal's leg without wrinkling and bunching up adjacent its lower portion, a diagonal stripe 36 can be sewn to one face of the panel 12 before the strips 24 are applied. The stripe 36 can be any closely woven, relatively stiff material, such as nylon webbing. This diagonal stripe 36 could also be applied to the embodiment of FIGS. 1 and 2.

It has been found that the embodiment of FIGS. 1 and 2 is particularly well suited to protect animal legs from flying and crawling insects, while the embodiment of FIGS. 3 and 4 is best suited for open field use where the presence of plants with burrs, stickers and the like are present. The mesh 12 can be a single color or two colors, one to each side of the diagonal stripe 36, for example, and the binding 22, 32 may be the same color as the mesh 12 or contrast with it.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

The embodiments of the invention in which an exclusive property or privilege is claimed are defined as follows:

1. A wrap for placement about the leg of an animal to keep insects and stickers from such leg while permitting the free flow of air and heat therethrough comprising:
    a) a flat rectangular panel means constructed of a single ply of substantially flexible mesh material having a predetermined length and a predetermined width defined by a continuous upper edge, a continuous lower edge and two marginal edges, said panel means adapted to be wrapped about an animal's leg in an edge overlapping manner to enclose said animal's leg without applying any compressive forces to said animal's leg and longitudinal tensile loading to said mesh material;
    b) binding means comprising a plush material contained upon a material backing strip, secured to said upper edge, said lower edge and said two marginal edges to prevent direct contact between said edges and the leg of an animal on which it is installed and to prevent access to such animal's leg below said panel means; and
    c) at least two fastening means, each of said fastening means being substantially narrower than the full width of said panel from said upper edge to said lower edge, for securing said panel in position after said panel has been wrapped in an edge overlapping manner about the leg of an animal.

2. A wrap as defined in claim 1, wherein said plush material is lamb's wool.

3. A wrap as defined in claim 1, further comprising a material layer between said binding means and said mesh panel means.

4. A wrap as defined in claim 1, further comprising a strengthening member fastened to said mesh panel means and extending diagonally across one surface of said panel means.

5. A wrap as defined in claim 1, wherein said fastening means each comprise:
    a) a length of loop-type material; and
    b) a length of hook-type material, whereby the hook-type material can be joined to the loop-type material at a number of positions to permit said wrap to be fastened about animal legs of differing diameter.

6. A wrap as defined in claim 1, wherein said mesh panel means is made of an elastomeric material.

7. A wrap for placement about the leg of an animal to keep insects and stickers from such leg comprising:
    a) a flat rectangular panel means of a mesh material having a predetermined length and a predetermined width defined by a continuous upper edge, a continuous lower edge and two marginal edges;
    b) binding means secured to said upper edge, said lower edge and said two marginal edges to prevent direct contact between said edges and the leg of an animal on which it is installed and to prevent access to such animal's leg below said panel means;
    c) at least two fastening means for securing said panel in position after said panel means has been wrapped about the leg of an animal; and
    d) a material layer between said binding means and said mesh panel means, said material layer being a layer of foam.

8. A wrap for placement about the leg of an animal to keep insects and stickers from such leg comprising:
    a) a flat rectangular panel means of a mesh material having a predetermined length and a predetermined width defined by a continuous upper edge, a continuous lower edge and two marginal edges;
    b) a plush material binding means secured to said upper edge, said lower edge and said two marginal edges to prevent direct contact between said edges and the leg of an animal on which it is installed and to prevent access to such animal's leg below said panel means;
    c) at least two fastening means for securing said panel means in position after said panel means has been wrapped about the leg of an animal; and
    d) a material layer between said plush binding means and said mesh panel means, said material layer being a layer of foam.

9. A wrap for placement about the leg of an animal to keep insects and stickers from such leg comprising:
   a) a flat rectangular panel means of a mesh material having a predetermined length and a predetermined width defined by a continuous upper edge, a continuous lower edge and two marginal edges;
   b) a smooth fabric binding means secured to said upper edge, said lower edge and said two marginal edges to prevent direct contact between said edges and the leg of an animal on which it is installed and to prevent access to such animal's leg below said panel means;
   c) at least two fastening means for securing said panel means in position after said panel means has been wrapped about the leg of an animal; and
   d) a material layer between said smooth fabric binding means and said mesh panel means, said material layer being a layer of foam.

* * * * *